United States Patent
Gofman (10) Patent No.: US 10,948,971 B2
(45) Date of Patent: Mar. 16, 2021

(54) SYSTEMS, APPARATUS, AND METHODS FOR POWERING ELECTRONIC DEVICES WITH LOW VOLTAGE BATTERIES

(71) Applicant: ASCENSIA DIABETES CARE HOLDINGS AG, Basel (CH)

(72) Inventor: Igor Y. Gofman, Croton-on-Hudson, NY (US)

(73) Assignee: Ascensia Diabetes Care Holdings AG, Basel (CH)

(*) Notice: Subject to any disclaimer, the term of this patent is extended or adjusted under 35 U.S.C. 154(b) by 148 days.

(21) Appl. No.: 16/305,831

(22) PCT Filed: Jun. 1, 2017

(86) PCT No.: PCT/EP2017/063362
§ 371 (c)(1),
(2) Date: Nov. 29, 2018

(87) PCT Pub. No.: WO2017/207713
PCT Pub. Date: Dec. 7, 2017

(65) Prior Publication Data
US 2019/0187773 A1 Jun. 20, 2019

Related U.S. Application Data (60) Provisional application No. 62/344,383, filed on Jun. 1, 2016.

(51) Int. Cl.
*G06F 1/26* (2006.01)
*G06F 1/3234* (2019.01)
*H02J 7/00* (2006.01)

(52) U.S. Cl.
CPC .............. *G06F 1/3243* (2013.01); *G06F 1/26* (2013.01); *H02J 2007/0067* (2013.01); *H02J 2207/20* (2020.01)

(58) Field of Classification Search
CPC ...... G06F 1/3243; G06F 1/26; H02J 2207/20; H02J 2007/0067
See application file for complete search history.

(56) References Cited

U.S. PATENT DOCUMENTS

| 4,698,530 A | 10/1987 | Thomson |
| 5,621,250 A * | 4/1997 | Kim ...................... B60L 1/00 |
| | | 307/10.1 |

(Continued)

FOREIGN PATENT DOCUMENTS

| CN | 103176938 A | 6/2013 |
| EP | 2269671 | 1/2011 |

(Continued)

OTHER PUBLICATIONS

Taiwan Search Report of Taiwan Application No. 104122949 dated Mar. 28, 2019.

(Continued)

*Primary Examiner* — Aurel Prifti
(74) *Attorney, Agent, or Firm* — Dugan & Dugan, PC (57) ABSTRACT

Embodiments of the present invention provide systems, apparatus, and methods for powering electronic devices with low voltage batteries. Embodiments include a circuit including a transistor having a base, an emitter, and a collector; a microcontroller having an output port, a system power terminal, and an input port; a first signal generated from the output port of the microcontroller and coupled to an enable pin of a DC-DC booster; and a second signal generated from the output port of the microcontroller and coupled to the base of the transistor, wherein the second signal is an inverted version of the first signal. The emitter of the transistor is coupled to ground and the collector of the transistor is coupled to the enable pin of the DC-DC booster. Numerous additional aspects are disclosed.

20 Claims, 8 Drawing Sheets

(56) References Cited

U.S. PATENT DOCUMENTS

| | | | |
|---|---|---|---|
| 5,754,890 A * | 5/1998 | Holmdahl | G06F 3/0383 |
| | | | 710/63 |
| 5,790,961 A | 8/1998 | Ingram et al. | |
| 5,818,206 A * | 10/1998 | Titus | G05F 1/44 |
| | | | 323/285 |
| 5,862,493 A | 1/1999 | Barkat et al. | |
| 7,447,922 B1 | 11/2008 | Asbury et al. | |
| 9,438,029 B2 * | 9/2016 | Cameron | H02J 5/00 |
| 2002/0171464 A1 * | 11/2002 | Stelle, IV | G06F 1/26 |
| | | | 327/198 |
| 2007/0075728 A1 * | 4/2007 | Chang | G06F 1/26 |
| | | | 324/764.01 |
| 2008/0030168 A1 | 2/2008 | Hsu | |
| 2008/0043498 A1 * | 2/2008 | Mohandes | H02M 1/34 |
| | | | 363/22 |
| 2008/0284501 A1 | 11/2008 | Kim | |
| 2009/0077277 A1 | 3/2009 | Vidal et al. | |
| 2010/0270862 A1 * | 10/2010 | Miyanaga | H01M 10/44 |
| | | | 307/66 |
| 2011/0046548 A1 | 2/2011 | Sakata | |
| 2011/0095615 A1 * | 4/2011 | Li | H02J 9/061 |
| | | | 307/80 |
| 2011/0291590 A1 | 12/2011 | Lin | |
| 2012/0221876 A1 * | 8/2012 | Chen | G06F 1/3296 |
| | | | 713/323 |
| 2013/0127523 A1 * | 5/2013 | Vereb | G06F 1/26 |
| | | | 327/536 |
| 2013/0151749 A1 | 6/2013 | Lai | |
| 2013/0166928 A1 | 6/2013 | Yang | |
| 2013/0195498 A1 * | 8/2013 | Kusumi | G03G 15/5004 |
| | | | 399/88 |
| 2013/0285633 A1 | 10/2013 | Johnson | |
| 2014/0075066 A1 * | 3/2014 | Menard | G06F 13/385 |
| | | | 710/104 |
| 2014/0111030 A1 * | 4/2014 | Chou | G05F 1/10 |
| | | | 307/130 |
| 2014/0167682 A1 * | 6/2014 | Peabody | H02M 1/44 |
| | | | 320/107 |
| 2015/0253743 A1 * | 9/2015 | Lee | H02H 9/002 |
| | | | 307/116 |
| 2015/0357864 A1 | 12/2015 | Gofman | |
| 2015/0357895 A1 * | 12/2015 | Preuss | H02K 11/215 |
| | | | 310/12.01 |
| 2016/0124482 A1 * | 5/2016 | Yu | G06F 1/3206 |
| | | | 713/320 |
| 2016/0162014 A1 * | 6/2016 | Jeon | G06F 1/26 |
| | | | 713/323 |
| 2016/0323947 A1 * | 11/2016 | Seki | H02M 3/156 |
| 2017/0205862 A1 | 7/2017 | Gofman et al. | |
| 2017/0249166 A1 * | 8/2017 | Nisarga | G06F 1/3253 |

FOREIGN PATENT DOCUMENTS

| | | |
|---|---|---|
| EP | 2602722 A2 | 6/2013 |
| TW | M398657 | 2/2011 |
| TW | 201324177 | 6/2013 |
| TW | M465703 | 11/2013 |
| WO | WO2016/010785 | 1/2016 |

OTHER PUBLICATIONS

International Search Report and Written Opinion of International Application No. PCT/US2015/039534 dated Oct. 8, 2015.
International Search Report and Written Opinion of International Application No. PCT/US2015/034298 dated Mar. 23, 2016.
International Preliminary Report on Patentability of International Application No. PCT/US2015/034298 dated Dec. 15, 2016.
International Preliminary Report on Patentability of International Application No. PCT/US2015/039534 dated Jan. 26, 2017.
Hewlett-Packard Company et al., "Universal Serial Bus 3.1 Specification," Jul. 26, 2013, Revision 1.0, pp. 11-6,7 (year; 2013).
International Search Report and Written Opinion of International Application No. PCT/EP2017/063362 dated Sep. 15, 2017.
International Preliminary Report on Patentability of International Application No. PCT/EP2017/063362 dated Dec. 13, 2018.

* cited by examiner

SYSTEMS, APPARATUS, AND METHODS FOR POWERING ELECTRONIC DEVICES WITH LOW VOLTAGE BATTERIES

RELATED APPLICATION

The present application claims priority to U.S. Provisional Patent Application No. 62/344,383, filed Jun. 1, 2016, and entitled "SYSTEMS, APPARATUS, AND METHODS FOR POWERING ELECTRONIC DEVICES WITH LOW VOLTAGE BATTERIES" which is hereby incorporated herein by reference in its entirety for all purposes.

FIELD

The present invention relates to powering electronic devices, and more specifically to systems, apparatus, and methods for powering such devices with low voltage batteries.

BACKGROUND

Optimizing the power consumption of electronic devices that run on battery power in order to maximize both stand-by and run time while providing stable, reliable operating performance is a complex problem. Electronic devices can be powered by many different batteries based on different chemistries that generate different voltages. Typically, the circuitry used to control consumption of the battery power is primarily designed to insure that the correct voltage and power are supplied to the powered devices (e.g., a microprocessor). Reducing stand-by power drain is typically a secondary consideration but in low power electronics that desirably only call for low power batteries, stand-by power drain can be a significant problem. Thus, what is needed are improved systems, apparatus, and methods for eliminating external power drain from batteries while in stand-by mode.

SUMMARY

In some embodiments, the present invention provides apparatus for powering electronic devices with low voltage batteries. The apparatus includes a circuit including a transistor having a base, an emitter, and a collector; a microcontroller having an output port, a system power terminal, and an input port; a first signal generated from the output port of the microcontroller and coupled to an enable pin of a DC-DC booster; and a second signal generated from the output port of the microcontroller and coupled to the base of the transistor, wherein the second signal is an inverted version of the first signal. The emitter of the transistor is coupled to ground and the collector of the transistor is coupled to the enable pin of the DC-DC booster.

In other embodiments, a method of powering electronic devices using low voltage batteries is provided. The method includes providing a circuit with a first transistor having a base, an emitter, and a collector, wherein the emitter is coupled to ground and the collector is coupled to an enable pin of a DC-DC booster; providing a microcontroller having an output port, a system power terminal, and an input port; generating a first signal from the output port of the microcontroller; transmitting the first signal to the enable pin of the DC-DC booster; generating a second signal from the output port of the microcontroller, wherein the second signal is an inverted version of the first signal; and transmitting the second signal to the base of the first transistor.

In yet other embodiments, a system for powering a blood glucose meter using a low voltage battery is provided. The system includes a microcontroller having an output port, a system power terminal, an input port, data terminals, and control terminals; a sensor port for receiving a blood glucose sensor, the port coupled to the data terminals and control terminals of the microcontroller; a first signal generated from the output port of the microcontroller and coupled to an enable pin of a DC-DC booster; a first transistor having a base, an emitter, and a collector; and a second signal generated from the output port of the microcontroller and coupled to the base of the first transistor, wherein the second signal is an inverted version of the first signal. The emitter of the first transistor is coupled to ground and the collector of the first transistor is coupled to the enable pin of the DC-DC booster.

Still other features, aspects, and advantages of the present invention will become more fully apparent from the following detailed description, the appended claims, and the accompanying drawings by illustrating a number of exemplary embodiments and implementations, including the best mode contemplated for carrying out the present invention. Embodiments of the present invention may also be capable of other and different applications, and its several details may be modified in various respects, all without departing from the spirit and scope of the present invention. Accordingly, the drawings and descriptions are to be regarded as illustrative in nature, and not as restrictive. The drawings are not necessarily drawn to scale. The description is intended to cover all modifications, equivalents, and alternatives falling within the spirit and scope of the claims.

DETAILED DESCRIPTION

Embodiments of the present invention provide systems, apparatus, and methods for powering electronic devices with low voltage batteries. Embodiments provide means to concurrently use a single cell low voltage battery (e.g., alkaline, zinc oxide, silver oxide, etc.), a momentary switch for manually turning an electronic device ON and OFF, the ability to turn the electronic device OFF automatically, and to reduce "sleep current" or stand-by power consumption of the electronic device to zero. Existing, prior art circuits do not allow the combination of all of these features.

Figure 1:
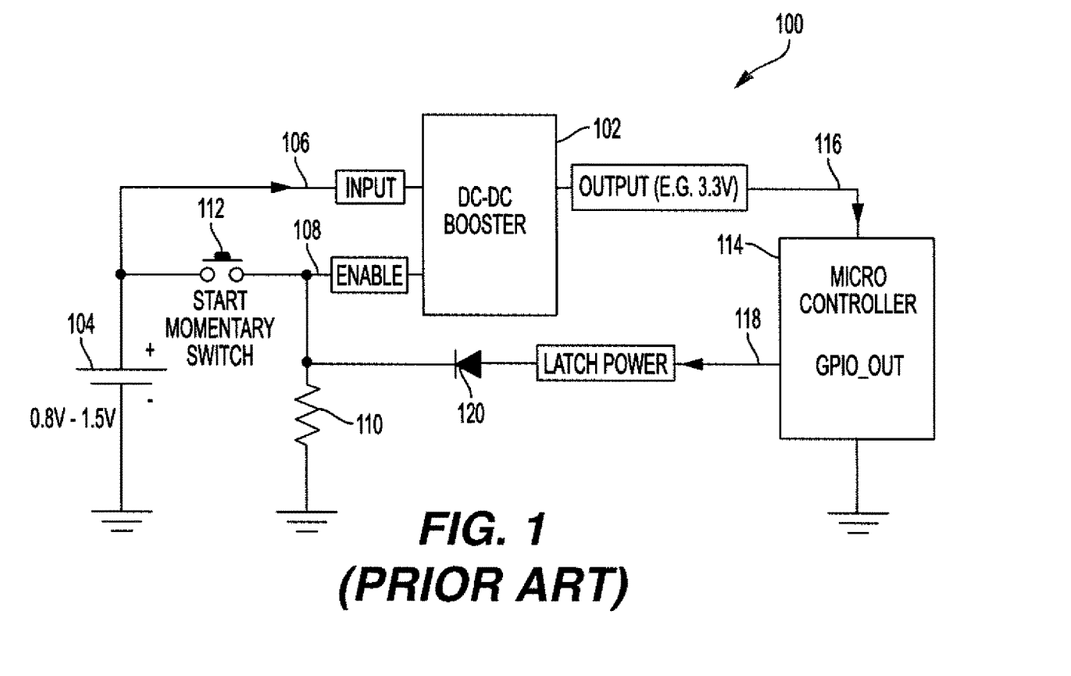
FIG. 1 is a schematic diagram depicting a prior art circuit using a momentary switch.
Figure 2:
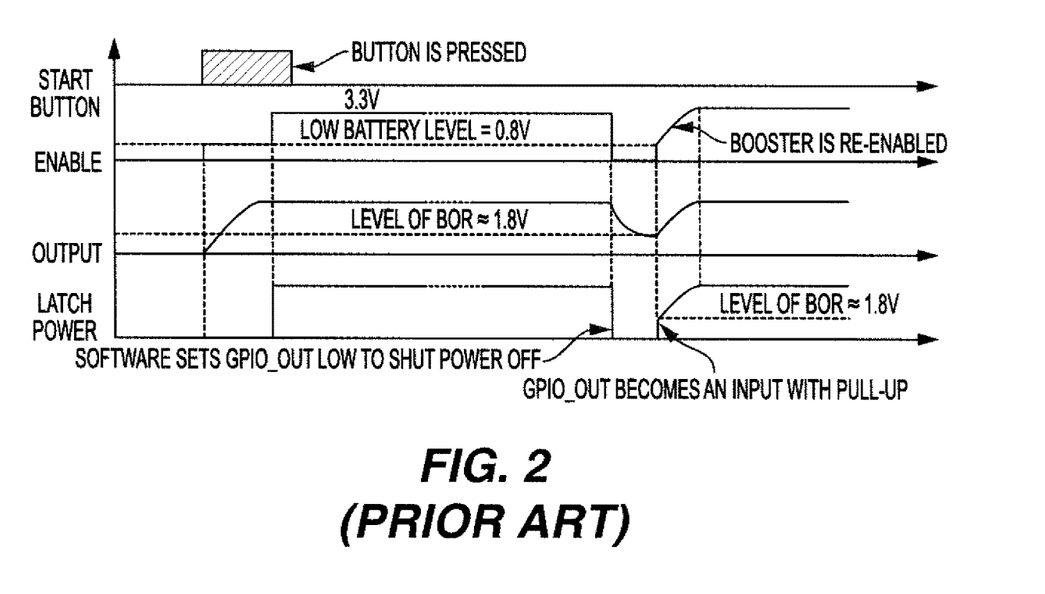
FIG. 2 is a timing diagram for the circuit of FIG. 1.

Electronic devices that do not use a real time clock can be completely unpowered while in sleep mode. A conventional solution for implementing a sleep or stand-by mode that is used in many handheld electronic devices is shown in the circuit 100 of FIG. 1. The timing diagram for the circuit 100 of FIG. 1 is shown in FIG. 2. The entire circuit 100 is completely unpowered in sleep mode because the booster 102 is disabled. However, the battery 104 remains connected to the booster 102. Typical leakage current through the INPUT pin coupled to node 106 when the booster 102 is disabled is negligible (typically <0.1 uA). In sleep mode the booster 102 is disabled because booster enable pin 108 is pulled down via resistor 110. When the user engages the momentary switch 112, the DC-DC booster 102 becomes enabled and starts working. The microcontroller 114 gets power via booster output voltage 116.

The booster voltage can be set to 3.3V or other voltage required by the microcontroller's specification. At start-up the microcontroller 114 generates a high level signal on node 118 "LATCH POWER" that reaches booster enable pin 108 through diode 120 and the booster's enable pin 108 is thus latched up. Even after the user releases the momentary switch 112, the booster 102 continues to work. The diode 120 protects the GPIO_OUT pin of the microcontroller 114 from battery voltage when the switch 112 is engaged but the microcontroller 114 still pulls the GPIO_OUT pin down.

A first issue with the approach of circuit 100 is that this circuit 100 does not allow the user to turn power OFF manually by, for example, pressing the momentary switch 112. Note that when the battery 104 has partially run down, the voltage is too low (e.g., 0.8V) to be considered as a logic level voltage that can be recognized and processed by the microcontroller 303.

A second issue with circuit 100 is that this approach will not work reliably with microcontrollers that have a brown-out reset (BOR) function which is commonly implemented in many current devices. A brownout reset function is implemented using a circuit inside the microcontroller 114 that resets (or reboots) the microcontroller 114 in the event of a brownout, i.e., a significant drop in the power supply output voltage. Typically, during a BOR the microcontroller 114 sets all GPIO pins into input mode with pull-up resistors. This affects the circuit 100 shown in FIG. 1 when the device is shutting down. A typical trigger level for BOR is in the range of 1.5V to 2.0V.

The circuit 100 shown in FIG. 1 can be unpowered by the microcontroller 114 only when an inactivity time out period has expired. An example of an ineffective powering OFF sequence is shown below and in the timing diagram of FIG. 2.

To initiate shut down, the microcontroller 114 sets GPIO_OUT pin to low in response to an instruction
ENABLE pin 108 becomes low via resistor 110
The DC-DC booster 102 turns off
Output voltage 116 decays
Once the output voltage 116 decays down to a BOR level (typical threshold varies from 1.5V to 2.0V), the microcontroller 114 resets and all the pins immediately behave as inputs with pull-up resistors
The signal level on node 118 at the GPIO_OUT pin becomes equal to the BOR level (1.5V-2.0V) via an internal pull-up resistor
The typical voltage to enable the booster 102 is 0.75V and thus the BOR threshold is large enough to re-enable the DC-DC booster 102
The booster 102 will start working again providing voltage 116 to the microcontroller 114
The microcontroller 114 will generate the signal "LATCH POWER" and the cycle will start again In other words, the circuit 100 of FIG. 1 will endlessly loop trying to shut down until the battery 104 is drained. This means that such a circuit 100 cannot be shut down automatically by itself (e.g., programmatically).

Embodiments of the present invention provide a solution to the above drawbacks of the prior art. Embodiments allow the user to reliably un-power a microcontroller manually as well as allow the microcontroller to power itself down automatically (e.g., after an inactivity period (e.g., a time out period ends and the microcontroller issues a shut down instruction)). The partial circuit 300 of FIG. 3 illustrates the basic theory of embodiments of the present invention.

Figure 3:
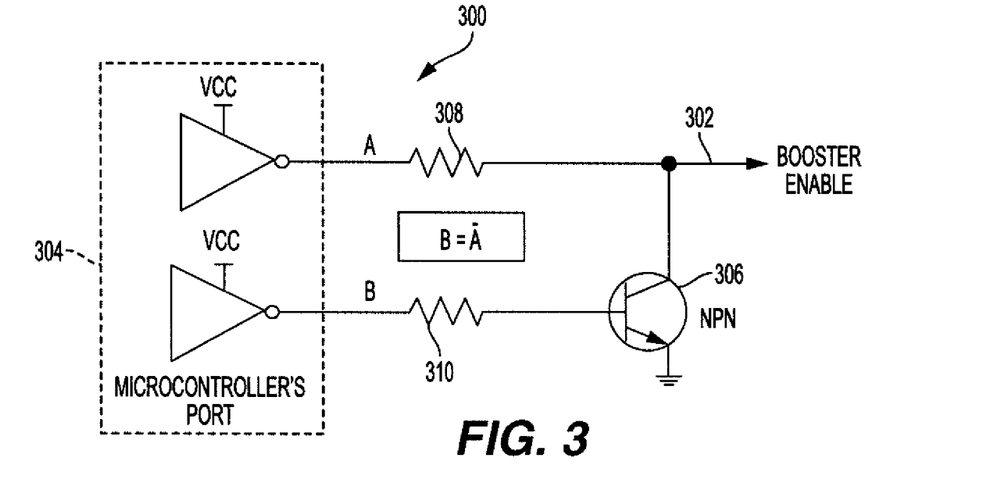
FIG. 3 is a schematic diagram depicting an example circuit according to embodiments of the present invention.

In FIG. 3, the Booster ENABLE line 302 can be reliably controlled even if the microcontroller has lost control due to low voltage. The signal on the Booster ENABLE line 302 is formed by two antiphase signals A and B that are generated from the same port 304 of the microcontroller. Signal A is connected to the Booster ENABLE line 302 via resistor 308 and signal B is connected to Booster ENABLE line 302 via resistor 310 and NPN transistor 306. To enable the booster (not shown in FIG. 3 but coupled to the Booster ENABLE line 302 via an enable pin), the signal A is required to be high and the signal B is required to be low. The NPN transistor 306 is OFF when signal B is low and the Booster ENABLE line 302 is thus high. To disable the booster and shut OFF the device, the microcontroller brings both A and B signals to a low level. The NPN transistor 306 still remains OFF but the Booster ENABLE line 302 becomes low because its source (signal A) is low. Since the booster is not operating, the power is decaying and eventually the microcontroller reaches the BOR state. In the BOR mode, both the A and B signals become high. Signal B, being high, turns on the NPN transistor 306 and the signal on the Booster ENABLE line 302 is pulled to low despite signal A being high. The microcontroller's power continues decaying, the microcontroller stops working and losses control on GPIOs. The behaviors of both signals A and B become unpredictable (they can be high or low) but they behave the same as each other because both of them come from the same port 304.

A truth table illustrating the relationship is shown below:

| Signal A | Signal B | State of NPN Transistor | Signal to Booster ENABLE |
|---|---|---|---|
| Low | Low | OFF | Low |
| Low | High | ON | Low |
| High | Low | OFF | High |
| High | High | ON | Low |

Figure 4A:
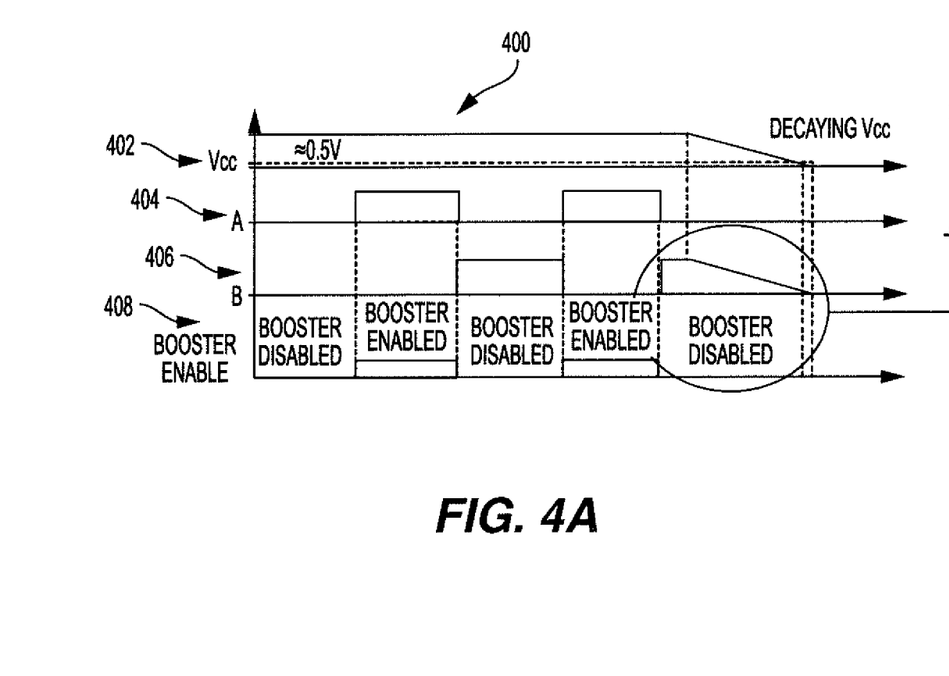
FIG. 4A is a timing diagram for the circuit of FIG. 3.
Figure 4B:
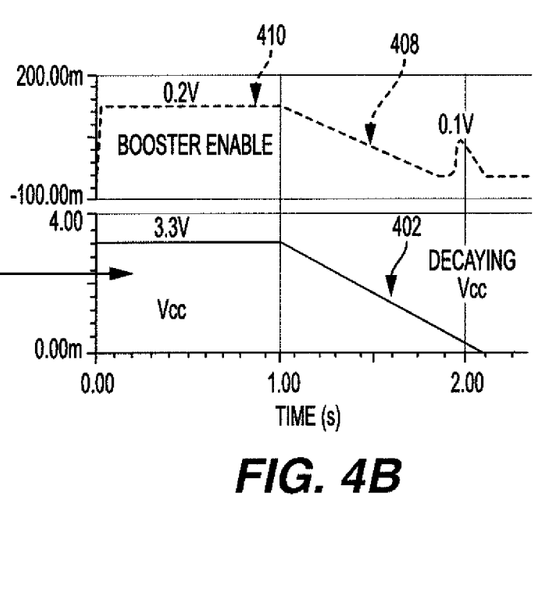
FIG. 4B is a SPICE simulation of the circuit of FIG. 3.

Note that the Booster ENABLE signal is High only when A=High and B=Low. In all other cases, the Booster ENABLE is low and decaying voltage does not affect the Booster ENABLE. This means that this solution allows reliably shutting OFF the entire device without re-enabling the booster (as prior art circuits would do as illustrated above). A timing diagram 400 is shown in FIG. 4A and output 410 of a simulation using a Simulation Program with Integrated Circuit Emphasis (SPICE) is shown in FIG. 4B. In FIG. 4A, the timing diagram 400 includes curves plotted over time representing $V_{CC}$ 402, signal A 404, signal B 406, and the Booster ENABLE signal 408. The SPICE simulation output 410 in FIG. 4B shows the decaying of $V_{CC}$ 402 to zero with the Booster ENABLE signal 408 going to zero.

Figure 5:
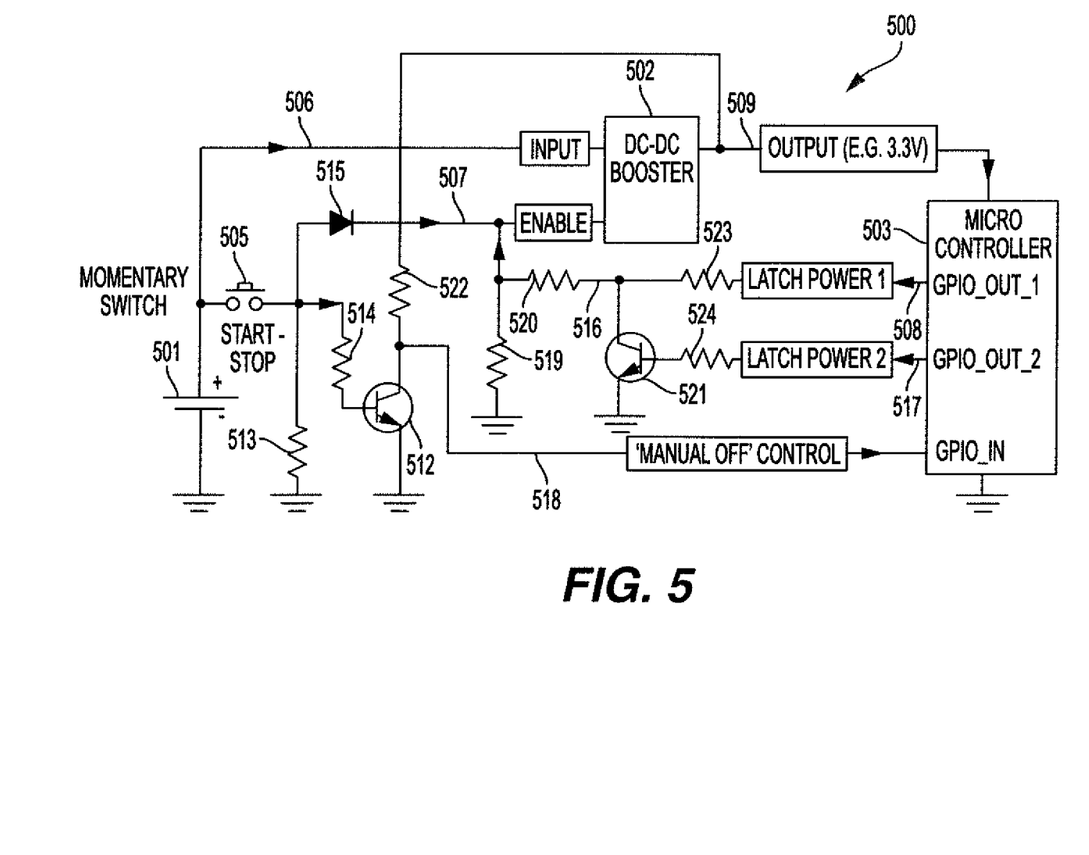
FIG. 5 is a schematic diagram depicting an example circuit according to embodiments of the present invention.
Figure 6:
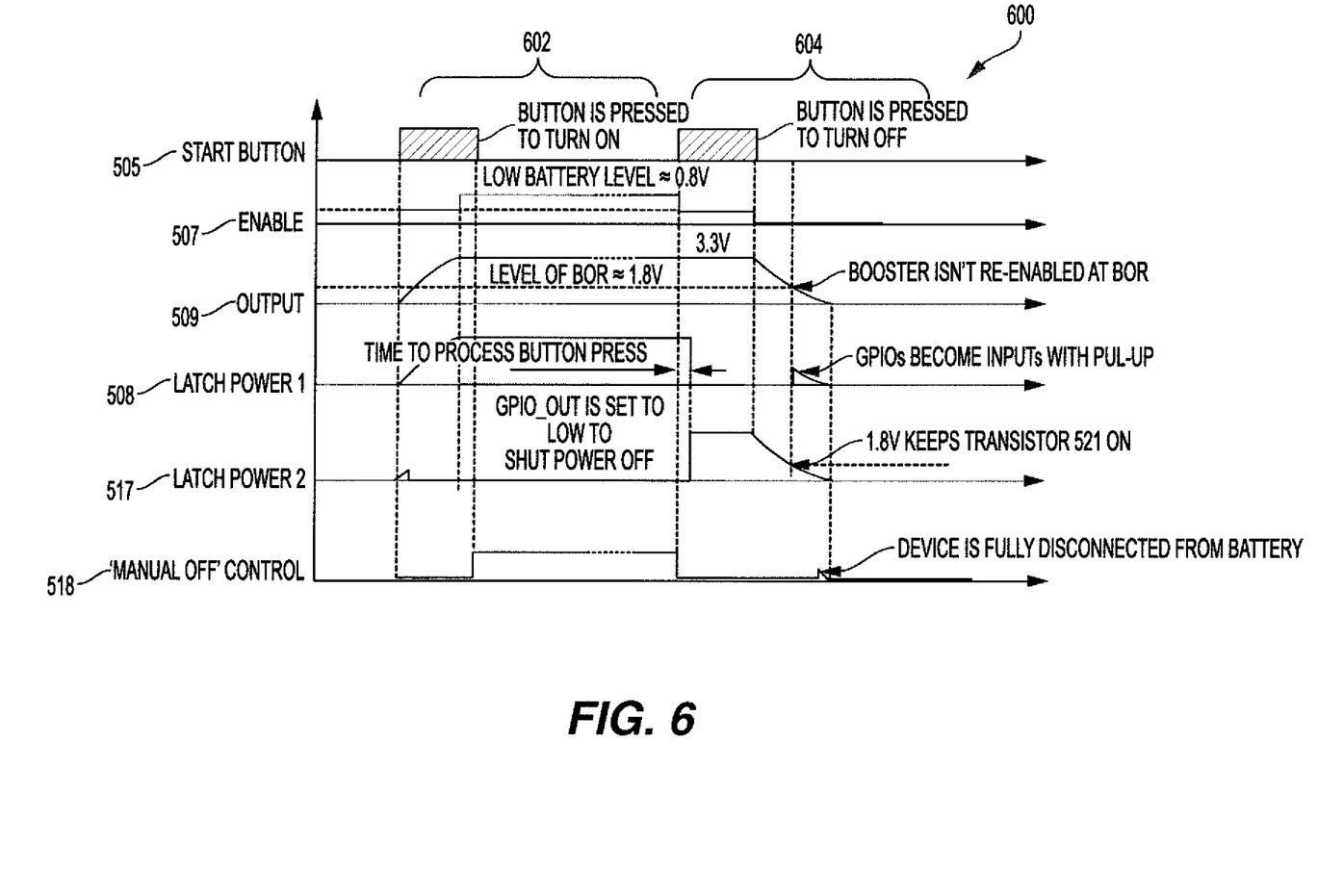
FIG. 6 is a timing diagram for the circuit of FIG. 5.

An example of a detailed schematic diagram depicting an example circuit 500 implementing embodiments of the present invention is shown in FIG. 5 and a corresponding timing diagram 600 is depicted in FIG. 6. As shown in FIG. 5, the battery 501 voltage reaches the INPUT of the DC-DC booster 502 through the line 506. The booster 502 can be enabled from two different sources: via the diode 515 or via the resistor 520. Initially the Enable pin 507 is pulled down to ground via resistor 519. The DC-DC booster 502 is disabled and drains no power. When the momentary switch 505 is pressed, the voltage from the battery 501 via diode 515 enables the booster 502. A typical minimum voltage required to enable a Low voltage booster is <0.75V. Therefore, even with a discharged alkaline battery 501 (e.g., at 0.8V) the booster 502 can be reliably enabled.

As shown in FIG. 6, a Powering UP sequence 602 can be implemented as follows. Once the user has pressed and held the momentary switch 505, the booster 502 starts working. The boosted output voltage 509 (e.g., 3.3V or so) reaches the microcontroller 503. The microcontroller 503 boots up and within a predetermine time, generates two antiphase signals LATCH POWER 1 (508) and LATCH POWER 2 (517) (e.g., analogous to signals A & B of circuit 300 of FIG. 3). The signal 508 becomes high and provides power to the collector of transistor 521 via resistor 523. The signal 517 becomes low, which, via resistor 524, keeps transistor 521 in an OFF state. This means that the signal at node 516 is high. The high level signal at node 516 flows to the ENABLE pin 507 through the resistive divider formed by resistors 519, 520, 523 and latches up the booster operation. Now, the user may release the Momentary Switch 505 and the booster 502 will remain operating.

Also as shown in FIG. 6, a Turn OFF sequence 604 can be implemented as follows. Note that a desirable feature of this solution (not available in prior art circuits such as the example of FIG. 1) is the fact that the user can manually turn the device OFF. To be able to provide a command to the microcontroller 503, the momentary switch 505 has to be able to generate a logic level signal. The momentary switch 505 is directly connected to the battery 501 that may (if discharged) provide only a low voltage signal (0.8V-1.5V) that is too low to be processed by the microcontroller 503. The transistor 512 converts a low battery voltage controlled by the momentary switch 505 to logic level. Assume that the device has been powered up and the momentary switch 505 is released by the user. The base of transistor 512 is pulled down to ground via resistor 513, which keeps the transistor 512 in an OFF state. The signal on line 518 stays high. When the user decides to turn the device OFF, he presses and holds the momentary switch 505. The base of transistor 512 becomes connected to the battery voltage. The transistor 512 turns ON and generates a low level signal on line 518 that can be processed by the microcontroller 503. The processing algorithm for this low level signal on line 518 can be selected to operate in different ways. For example, in some embodiments, if the user holds the momentary switch for particular period of time (e.g., more than 2 sec) the microcontroller 503 generates a sequence that will initiate a shutdown process. For example, the shut downs process can include the following:

- the microcontroller 503 pulls LATCH POWER 1 signal 508 down and at the same time the LATCH POWER 2 signal 517 is pulled up
- the Transistor 521 turns ON and pulls node 516 and pin 507 down
- the DC-DC booster 502 stops working and the Output voltage 509 is decaying
- once the Output voltage 509 reaches BOR level (e.g., 1.8V or so) the microcontroller 503 resets and places all the pins to "input state with pull-up resistors," the microcontroller 503 stops working, and both signals 508 and 517 become high
- the base of transistor 521 still remains biased from the microcontroller 503 because the signal 517 is high and therefore, the transistor 521 stays ON and pulls the node 516 down to ground, the ENABLE pin 507 is low and the booster 502 is not working
- the Output voltage 509 continues decaying
- once the Output voltage 509 reaches=0.5V, the transistor 521 loses control and the signal level of node 516 may become equal to the Output voltage (e.g., ~0.5V worst case)
- due to the divider formed by resistors 519, 520, 523 (which scales down the signal 508), the Enable pin 507 remains below the minimum voltage required to re-enable the booster 502
- the Output voltage 509 continues decaying until it becomes zero Unlike the circuit of FIG. 1, the re-enabling of the DC-DC booster 502 does not occur. In some embodiments, example values of the resistors 519,520,523 used to form the divider can be selected to meet the following criteria:

$$\begin{cases} \frac{0.5\,\text{V}}{(\text{Resistors } 519 + 520 + 523)} \times \text{Resistor } 519 < V_{DISABLE\_MAX\_VOLTAGE} \\ \frac{3.3\,\text{V}}{(\text{Resistors } 519 + 520 + 523)} \times \text{Resistor } 519 > V_{ENABLE\_MIN\_VOLTAGE} \end{cases}$$

Where, 0.5V is a typical base voltage of silicon NPN transistor 521 when it starts turning ON; 3.3V is a standard microcontroller 503 system voltage (509) (This voltage may vary in different cases); VDISABLE_MAX_VOLTAGE is the maximum voltage at the ENABLE pin that still keeps the booster 502 OFF; V ENABLE_MIN_VOLTAGE is the minimum voltage at the ENABLE pin that is required to start the booster 502 working.

The following example values are provided to illustrate the embodiment. For a typical low voltage booster (e.g., the model XC9131 step up DC/DC converter manufactured by Torex Semiconductor Ltd.), $V_{DISABLE\_MAX\_VOLTAGE}=0.2V$ and $V_{ENABLE\_MIN\_VOLTAGE}=0.75V$. Therefore, the equation above can be resolved for the infinite numbers of different resistors 519-520 values. For instance, the equation can be solved for the following values: resistor 519=100K, resistor 520=100K, resistor 523=100K. Thus, $$\begin{cases} \frac{0.5\,\text{V}}{(100\,\text{K}+100\,\text{K}+100\,\text{K})} \times 100\,\text{K} = 0.17\,\text{V} < V_{DISABLE\_MAX\_VOLTAGE} = 0.2\,\text{V} \\ \frac{3.3\,\text{V}}{(100\,\text{K}+100\,\text{K}+100\,\text{K})} \times 100\,\text{K} = 1.1\,\text{V} > V_{ENABLE\_MIN\_VOLTAGE} = 0.75\,\text{V} \end{cases}$$

Embodiments of the present invention allow controlling power in electronic devices (e.g., handheld devices such as blood glucose meters) to be powered from a single cell alkaline battery while completely eliminating sleep current to extend battery life and provide the user two ways to shut down the device, automatically (e.g., programmatically via the microcontroller) and manually (e.g., via push button or other type of switch).

Figure 7:
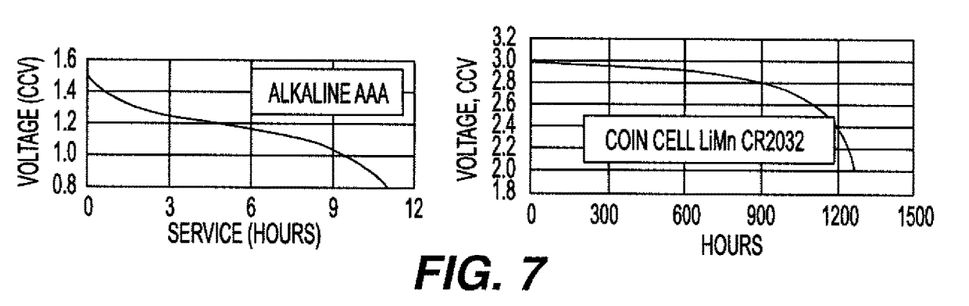
FIG. 7 depicts voltage over time graphs of example batteries.

As mentioned above, handheld electronic devices can be powered from different batteries based on different chemistries that generate different voltages. Some batteries provide relatively high voltage (e.g. LiMn which can go up to 3V) and can directly drive most microcontrollers. Unfortunately, these batteries provide very low current and sometimes the device draws a higher current. Unlike LiMn batteries, alkaline batteries can provide high power. These batteries are utilized in many consumer electronics devices. The voltage of alkaline batteries starts from 1.5V and becomes very low (e.g., 0.8V) at the end of the battery's life. Due to this low voltage, most microcontrollers cannot be powered directly from alkaline batteries. FIG. 7 depicts typical performance (i.e., voltage over time) curves for typical batteries. In many applications, microcontrollers use at least approximately 3V (e.g., 3.3V or so) to be able to control other devices. These microcontrollers may consume relatively higher power which is more than a 3V LiMn battery can provide. In such cases, a LiMn battery is not an option due to its low power capability. An alkaline battery can meet the power requirement but its voltage output can drop down to 0.8V when the microcontroller still requires at least of 3V. In this case, the battery voltage is boosted using a DC-DC booster.

Figure 8:
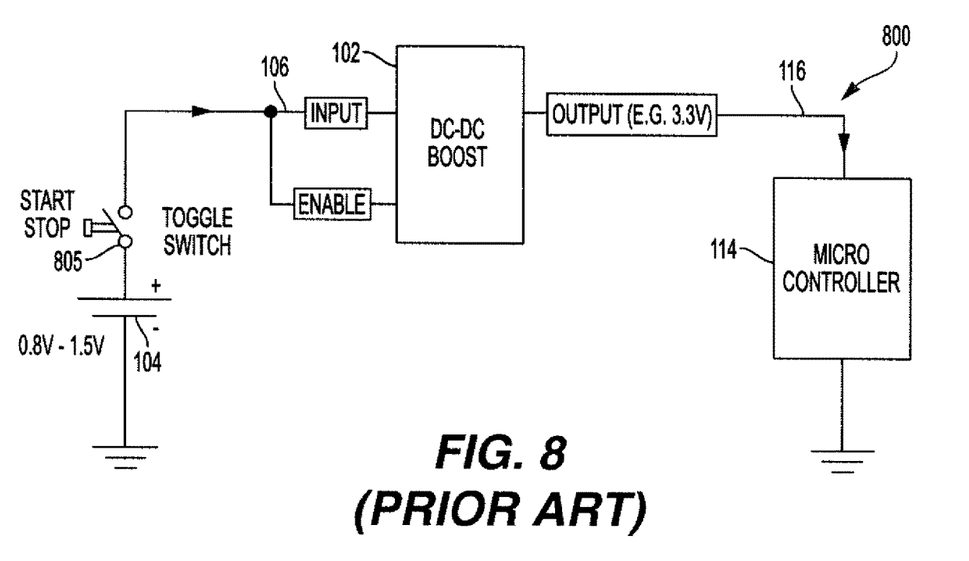
FIG. 8 is a schematic diagram depicting a prior art circuit using a toggle switch.

Controlling or managing voltage is a challenging task that depends on how the booster is being turned ON/OFF. Generally, there are three different ways to manage the device with a low voltage booster: using a manual toggle switch, continuously keeping the device powered, and using a momentary push button. In contrast to embodiments of the present invention illustrated above, a typical basic approach of using a toggle switch 805 is shown in the prior art circuit 800 of FIG. 8. The entire circuit 800 can be powered and unpowered by toggling the switch 805 coupled to the battery 104. This method provides a simple but limited solution for no current consumption occurring in the sleep mode since node 106 (coupled to the input and enable pins), and consequently DC-DC booster 102, receives no power. However, the toggle switch 805 is a bulky, inconvenient and expensive electromechanical device that cannot be used in applications that require automatic shut off when a time out period has expired. Typically a toggle switch is used in electronic toys and is not used in modern handheld electronic devices, particularly a toggle is not suitable for use in blood glucose meters.

Figure 9:
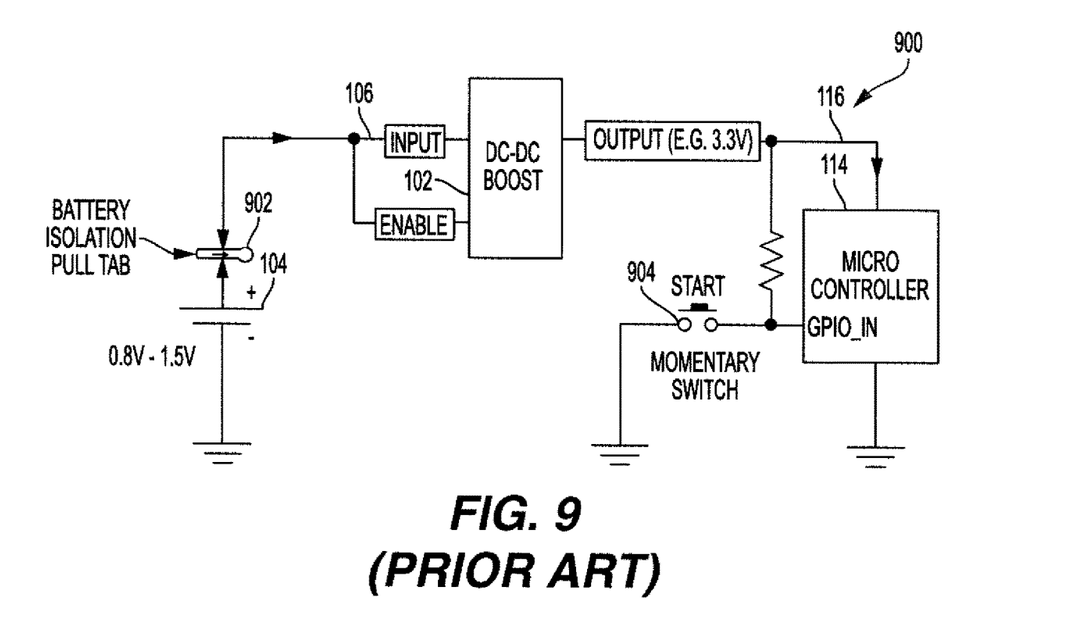
FIG. 9 is a schematic diagram depicting a prior art circuit using a battery isolation pull tab.

A typical approach using a continuously powered device is illustrated in the prior art circuit 900 of FIG. 9. To prevent continuous battery draining, the device typically comes from the manufacturer with a plastic battery isolation pull tab 902. The pull tab 902 has to be removed by the user. After removing the pull tab 902 the DC-DC booster 102 starts working. Unfortunately, once the pull tab 902 is removed, this circuit 900 always consumes power and drains the battery 104, even when the microcontroller 114 is in sleep mode (which can be activated using switch 904 and resistor 906 coupled to the Booster output voltage 116). While this approach is the least expensive for the manufacturer, as soon as the pull tab 902 is removed, the battery 104 is continuously draining and the user incurs the cost or inconvenience of replacing or recharging the battery 104. Solutions utilizing this idea typically require special low power DC-DC boosters that are still efficient at very low load current. However, even the most efficient DC-DC boosters running in ultra-low power mode still consume power. For instance, a very efficient booster commercially available from Texas Instruments, model TPS610981, continuously drains approximately 12 uA which is very significant in comparison to some electronic devices such as blood glucose meters which can use only 2 uA to 5 uA.

Figure 10:
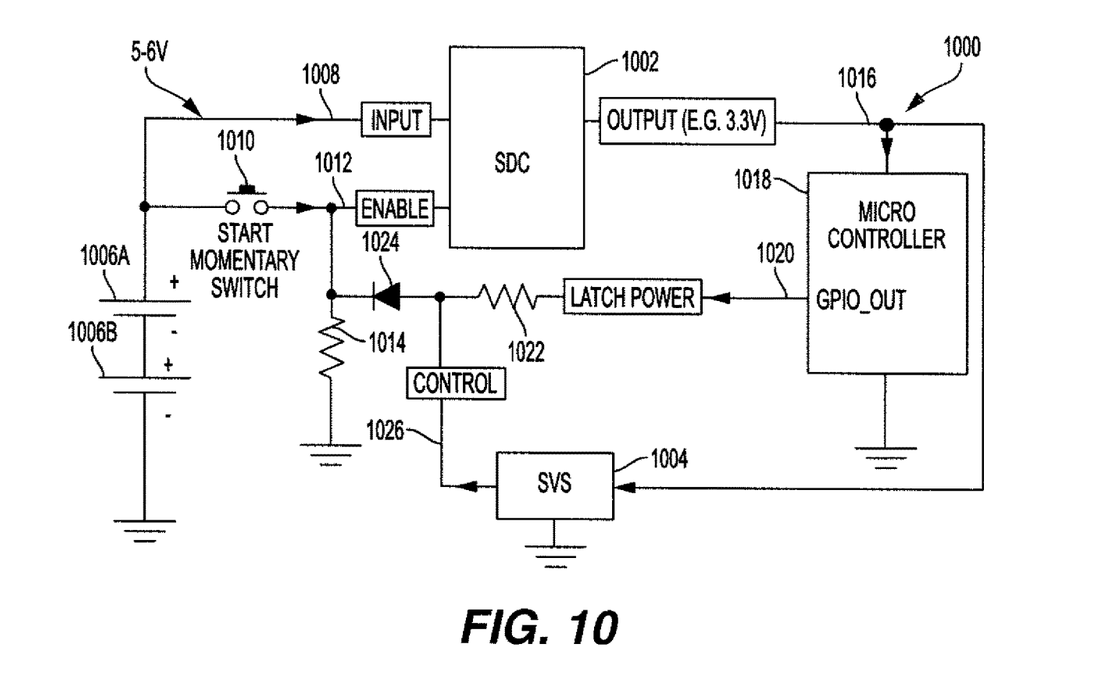
FIG. 10 is a schematic diagram depicting an example circuit according to alternate embodiments of the present invention.
Figure 11:
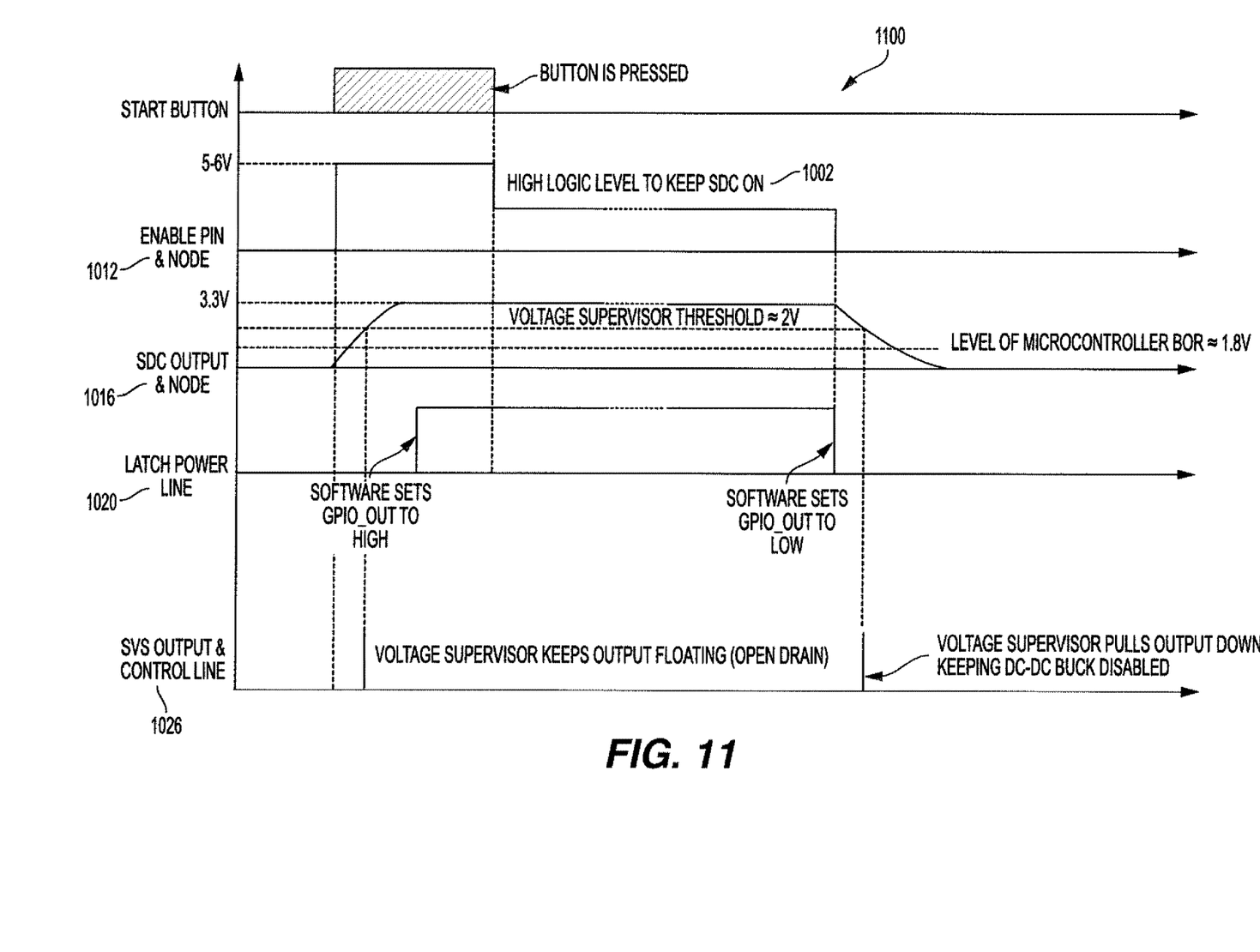
FIG. 11 is a timing diagram for the circuit of FIG. 10.

FIGS. 10 and 11 depict an alternative example embodiment of the present invention for use with relatively higher voltage batteries. Popular batteries such as Li-Ion and Li—Po provide relatively high voltage (e.g., up to 4.2V). However, most industrial microcontrollers require a lower voltage. A standard typical microcontroller system voltage is 3.3V. Thus, instead of a DC-DC booster (as in the above described embodiment), it may be desirable to use a step down converter such as a buck converter or a low-dropout regulator. A buck converter (i.e., step-down converter) is a DC-to-DC power converter which steps down voltage (while stepping up current) from its input (supply) to its output (load). A low-dropout or LDO regulator is a DC linear voltage regulator that can regulate the output voltage even when the supply voltage is very close to the output voltage. FIG. 10 illustrates a circuit 1000 that includes a step down converter (SDC 1002) and a supply voltage supervisor (SVS 1004). Supply Voltage Supervisor (supply voltage supervisory circuit) circuits are typically used to monitor the supply voltage to embedded and other micro-controller systems for under voltage conditions. In conventional use, if an under voltage condition is detected then the supervisory circuit will reset the controller and keep it in that state as long as the under voltage condition persists, still drawing power. FIG. 11 is a timing diagram 1100 that illustrates operation of example circuit 1000.

In the example circuit 1000 depicted, batteries 1006A, 1006B initially outputting approximately 5V or more are coupled in series to node 1008 which is coupled to the input pin of the SDC 1002. Momentary switch 1010 is also coupled to the batteries 1006A, 1006B and to node 1012 which is coupled to the enable pin of the SDC 1002 and pull down resistor 1014. The output of the SDC 1002 is coupled to node 1016 which is coupled to the power supply input of the microcontroller 1018 and the input of the SVS 1004. The GPIO_OUT pin of the microcontroller 1018 is coupled to the latch power line 1020 which is coupled to node 1012 (and the enable pin of the SDC 1002) via resistor 1022 and diode 1024. The output of the SVS 1004 is coupled to node 1012 (and the enable pin of the SDC 1002) via control line 1026 and diode 1024. An example of a commercially available SVS 1004 is the model TPS3600 SVS chip manufactured by Texas Instruments Incorporated.

As with the example embodiment of FIG. 5, the example embodiment of FIG. 10 allows the circuit 1000 to reduce battery drain to zero in stand-by mode, provide the user the ability to turn the device on and off using a momentary switch, and to allow the microcontroller to automatically shut itself down programmatically (e.g., after a predefined period of the device not being used). With reference to the timing diagram 1100 of FIG. 11, in operation the example circuit 1000 can be shut down via the following sequence:

The microcontroller 1018 (e.g., via software instructions) sets the GPIO_OUT pin (and consequently the latch power line 1020) to logic low Node 1012 (ENABLE pin) becomes low via resistor 1014

SDC 1002 stops working

SDC OUTPUT Voltage (Node 1016) starts decaying

When OUTPUT Voltage (Node 1016) approaches the SVS Threshold (e.g., 2V) the SVS Output (Control Line 1026) is pulled down The SVS Output (Control Line 1026) remains at logic low until the SDC OUTPUT Voltage (Node 1016) drops below ≈0.85V. At ≈0.85V and below the SVS 1004 losses control and the SVS Output (Control Line 1026) may become floating again However, the voltage of ≈0.85V is significantly below the microcontroller 1018 operating range, so all the microcontroller pins are inactive (floating) and cannot cause re-enabling of the SDC 1002

With further decaying of the SDC OUTPUT Voltage (Node 1016), the brown out reset (BOR) threshold of the microcontroller 1018 is passed while the SVS 1004 maintains the SDC 1002 in an OFF state Numerous embodiments are described in this disclosure, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

The present disclosure is neither a literal description of all embodiments nor a listing of features of the invention that must be present in all embodiments.

The Title (set forth at the beginning of the first page of this disclosure) is not to be taken as limiting in any way as the scope of the disclosed invention(s).

The term "product" means any machine, manufacture and/or composition of matter as contemplated by 35 U.S.C. § 101, unless expressly specified otherwise.

The terms "an embodiment", "embodiment", "embodiments", "the embodiment", "the embodiments", "one or more embodiments", "some embodiments", "one embodiment" and the like mean "one or more (but not all) disclosed embodiments", unless expressly specified otherwise.

The terms "the invention" and "the present invention" and the like mean "one or more embodiments of the present invention."

A reference to "another embodiment" in describing an embodiment does not imply that the referenced embodiment is mutually exclusive with another embodiment (e.g., an embodiment described before the referenced embodiment), unless expressly specified otherwise.

The terms "including", "comprising" and variations thereof mean "including but not limited to", unless expressly specified otherwise.

The terms "a", "an" and "the" mean "one or more", unless expressly specified otherwise.

The term "and/or", when such term is used to modify a list of things or possibilities (such as an enumerated list of possibilities) means that any combination of one or more of the things or possibilities is intended, such that while in some embodiments any single one of the things or possibilities may be sufficient in other embodiments two or more (or even each of) the things or possibilities in the list may be preferred, unless expressly specified otherwise. Thus for example, a list of "a, b and/or c" means that any of the following interpretations would be appropriate: (i) each of "a", "b" and "c"; (ii) "a" and "b"; (iii) "a" and "c"; (iv) "b" and "c"; (v) only "a"; (vi) only "b"; and (vii) only "c."

The term "plurality" means "two or more", unless expressly specified otherwise.

The term "herein" means "in the present disclosure, including anything which may be incorporated by reference", unless expressly specified otherwise.

The phrase "at least one of", when such phrase modifies a plurality of things (such as an enumerated list of things) means any combination of one or more of those things, unless expressly specified otherwise. For example, the phrase at least one of a widget, a car and a wheel means either (i) a widget, (ii) a car, (iii) a wheel, (iv) a widget and a car, (v) a widget and a wheel, (vi) a car and a wheel, or (vii) a widget, a car and a wheel.

The phrase "based on" does not mean "based only on", unless expressly specified otherwise. In other words, the phrase "based on" describes both "based only on" and "based at least on".

Each process (whether called a method, algorithm or otherwise) inherently includes one or more steps, and therefore all references to a "step" or "steps" of a process have an inherent antecedent basis in the mere recitation of the term 'process' or a like term. Accordingly, any reference in a claim to a 'step' or 'steps' of a process has sufficient antecedent basis.

When an ordinal number (such as "first", "second", "third" and so on) is used as an adjective before a term, that ordinal number is used (unless expressly specified otherwise) merely to indicate a particular feature, such as to distinguish that particular feature from another feature that is described by the same term or by a similar term. For example, a "first widget" may be so named merely to distinguish it from, e.g., a "second widget". Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; and (3) does not indicate that either widget ranks above or below any other, as in importance or quality. In addition, the mere usage of ordinal numbers does not define a numerical limit to the features identified with the ordinal numbers. For example, the mere usage of the ordinal numbers "first" and "second" before the term "widget" does not indicate that there must be no more than two widgets.

When a single device, component or article is described herein, more than one device, component or article (whether or not they cooperate) may alternatively be used in place of the single device, component or article that is described. Accordingly, the functionality that is described as being possessed by a device may alternatively be possessed by more than one device, component or article (whether or not they cooperate).

Similarly, where more than one device, component or article is described herein (whether or not they cooperate), a single device, component or article may alternatively be used in place of the more than one device, component or article that is described. For example, a plurality of computer-based devices may be substituted with a single computer-based device. Accordingly, the various functionality that is described as being possessed by more than one device, component or article may alternatively be possessed by a single device, component or article.

The functionality and/or the features of a single device that is described may be alternatively embodied by one or more other devices that are described but are not explicitly described as having such functionality and/or features. Thus, other embodiments need not include the described device itself, but rather can include the one or more other devices which would, in those other embodiments, have such functionality/features.

Devices that are in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for weeks at a time. In addition, devices that are in communication with each other may communicate directly or indirectly through one or more intermediaries.

A description of an embodiment with several components or features does not imply that all or even any of such components and/or features are required. On the contrary, a variety of optional components are described to illustrate the wide variety of possible embodiments of the present invention(s). Unless otherwise specified explicitly, no component and/or feature is essential or required.

Further, although process steps, algorithms or the like may be described in a sequential order, such processes may be configured to work in different orders. In other words, any sequence or order of steps that may be explicitly described does not necessarily indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

Although a process may be described as including a plurality of steps, that does not indicate that all or even any of the steps are essential or required. Various other embodiments within the scope of the described invention(s) include other processes that omit some or all of the described steps. Unless otherwise specified explicitly, no step is essential or required.

Although a product may be described as including a plurality of components, aspects, qualities, characteristics and/or features, that does not indicate that all of the plurality are essential or required. Various other embodiments within the scope of the described invention(s) include other products that omit some or all of the described plurality.

An enumerated list of items (which may or may not be numbered) does not imply that any or all of the items are mutually exclusive, unless expressly specified otherwise. Likewise, an enumerated list of items (which may or may not be numbered) does not imply that any or all of the items are comprehensive of any category, unless expressly specified otherwise. For example, the enumerated list "a computer, a laptop, a PDA" does not imply that any or all of the three items of that list are mutually exclusive and does not imply that any or all of the three items of that list are comprehensive of any category.

Headings of sections provided in this disclosure are for convenience only, and are not to be taken as limiting the disclosure in any way.

"Determining" something can be performed in a variety of manners and therefore the term "determining" (and like terms) includes calculating, computing, deriving, looking up (e.g., in a table, database or data structure), ascertaining, recognizing, and the like.

A "processor" means any one or more microprocessors, Central Processing Unit (CPU) devices, computing devices, microcontrollers, digital signal processors, or like devices. Exemplary processors are the INTEL PENTIUM or AMD ATHLON processors.

It will be readily apparent that the various methods and algorithms described herein may be implemented by a control system and/or the instructions of the software may be designed to carry out the processes of the present invention.

The present disclosure provides, to one of ordinary skill in the art, an enabling description of several embodiments and/or inventions. Some of these embodiments and/or inventions may not be claimed in the present application, but may nevertheless be claimed in one or more continuing applications that claim the benefit of priority of the present application. Applicants intend to file additional applications to pursue patents for subject matter that has been disclosed and enabled but not claimed in the present application.

The foregoing description discloses only example embodiments of the invention. Modifications of the above-disclosed apparatus, systems and methods which fall within the scope of the invention will be readily apparent to those of ordinary skill in the art.

Accordingly, while the present invention has been disclosed in connection with exemplary embodiments thereof, it should be understood that other embodiments may fall within the spirit and scope of the invention, as defined by the following claims.

The invention claimed is:

1. A circuit comprising:
   a first transistor having a base, an emitter, and a collector;
   a microcontroller having an output port, a system power terminal, and an input port;
   a first signal generated from the output port of the microcontroller and coupled to an enable pin of a DC-DC booster; and
   a second signal generated from the output port of the microcontroller and coupled to the base of the first transistor, wherein the second signal is an inverted version of the first signal,
   wherein the emitter of the first transistor is coupled to ground and the collector of the first transistor is coupled to the enable pin of the DC-DC booster.

2. The circuit of claim 1 further comprising:
   the DC-DC booster having an input, the enable pin, and an output terminal;
   a battery coupled to the input of a DC-DC booster;
   a momentary switch coupled between the battery and the enable pin of the DC-DC booster; and
   a first resistor coupled in series between the collector of the first transistor and the enable pin of the DC-DC booster,
   wherein the output terminal of the DC-DC booster is coupled to the system power terminal of the microcontroller.

3. The circuit of claim 2 further comprising:
   a resistive divider formed from the first resistor, a second resistor coupled between ground and the enable pin of the DC-DC booster, and a third resistor coupled between the output port of the microcontroller generating the first signal and the collector of the first transistor.

4. The circuit of claim 3 wherein the values of the first, second and third resistors are selected so as to prevent the DC-DC booster from being re-enabled by a brownout reset function of the microcontroller.

5. The circuit of claim 3 further comprising a second transistor having a base, an emitter, and a collector wherein the base is coupled to the momentary switch, the emitter is coupled to ground, and the collector is coupled to the output terminal of the DC-DC booster.

6. The circuit of claim 5 wherein the collector of the second transistor is further coupled to the input port of the microcontroller.

7. The circuit of claim 6 further comprising a diode coupled between the momentary switch and the enable pin of the DC-DC booster.

8. A method of powering a device, the method comprising:
providing a circuit with a first transistor having a base, an emitter, and a collector, wherein the emitter is coupled to ground and the collector is coupled to an enable pin of a DC-DC booster;
providing a microcontroller having an output port, a system power terminal, and an input port;
generating a first signal from the output port of the microcontroller;
transmitting the first signal to the enable pin of the DC-DC booster;
generating a second signal from the output port of the microcontroller, wherein the second signal is an inverted version of the first signal; and
transmitting the second signal to the base of the first transistor.

9. The method of claim 8 further comprising:
providing the DC-DC booster with an input, the enable pin, and an output terminal wherein the output terminal is coupled to the system power terminal of the microcontroller;
coupling a battery to the input of a DC-DC booster;
providing a momentary switch coupled between the battery and the enable pin of the DC-DC booster; and
coupling a first resistor in series between the collector of the first transistor and the enable pin of the DC-DC booster.

10. The method of claim 9 further comprising:
using a resistive divider formed from the first resistor, a second resistor coupled between ground and the enable pin of the DC-DC booster, and a third resistor coupled between the output port of the microcontroller generating the first signal and the collector of the first transistor to prevent the DC-DC booster from being re-enabled by a brownout reset function of the microcontroller.

11. The method of claim 10 further comprising:
setting the first signal to a logic low value and the second signal to a logic high value programmatically via the microcontroller;
biasing the first transistor, in response to the second signal, to pull the enable pin of the DC-DC booster to a low logic level;
disabling the DC-DC booster in response to the enable pin being pulled to a low logic level; and
allowing an output voltage on the output terminal of the DC-DC booster to decay to a brownout reset level.

12. The method of claim 11 further comprising:
resetting the microcontroller in response to the decaying output voltage of the DC-DC booster reaching the brownout reset level; and
setting both the first and second signals to a high logic level.

13. The method of claim 12 further comprising:
maintaining the bias on the first transistor, in response to the second signal, to maintain the enable pin of the DC-DC booster at a low logic level;
allowing the output voltage on the output terminal of the DC-DC booster to further decay; and
preventing the DC-DC booster from becoming re-enabled using the resistive divider.

14. A system comprising:
a microcontroller having an output port, a system power terminal, an input port, data terminals, and control terminals;
a sensor port for receiving a blood glucose sensor, the sensor port coupled to the data terminals and control terminals of the microcontroller;
a first signal generated from the output port of the microcontroller and coupled to an enable pin of a DC-DC booster;
a first transistor having a base, an emitter, and a collector; and
a second signal generated from the output port of the microcontroller and coupled to the base of the first transistor, wherein the second signal is an inverted version of the first signal,
wherein the emitter of the first transistor is coupled to ground and the collector of the first transistor is coupled to the enable pin of the DC-DC booster.

15. The system of claim 14 further comprising:
the DC-DC booster having an input, the enable pin, and an output terminal;
a battery coupled to the input of a DC-DC booster;
a momentary switch coupled between the battery and the enable pin of the DC-DC booster; and
a first resistor coupled in series between the collector of the first transistor and the enable pin of the DC-DC booster,
wherein the output terminal of the DC-DC booster is coupled to the system power terminal of the microcontroller.

16. The system of claim 15 further comprising:
a resistive divider formed from the first resistor, a second resistor coupled between ground and the enable pin of the DC-DC booster, and a third resistor coupled between the output port of the microcontroller generating the first signal and the collector of the first transistor.

17. The system of claim 16 wherein the values of the first, second and third resistors are selected so as to prevent the DC-DC booster from being re-enabled by a brownout reset function of the microcontroller.

18. The system of claim 17 further comprising a second transistor having a base, an emitter, and a collector wherein the base is coupled to the momentary switch, the emitter is coupled to ground, and the collector is coupled to the output terminal of the DC-DC booster.

19. The system of claim 18 wherein the collector of the second transistor is further coupled to the input port of the microcontroller.

20. The system of claim 19 further comprising a diode coupled between the momentary switch and the enable pin of the DC-DC booster.

* * * * *